UNITED STATES PATENT OFFICE.

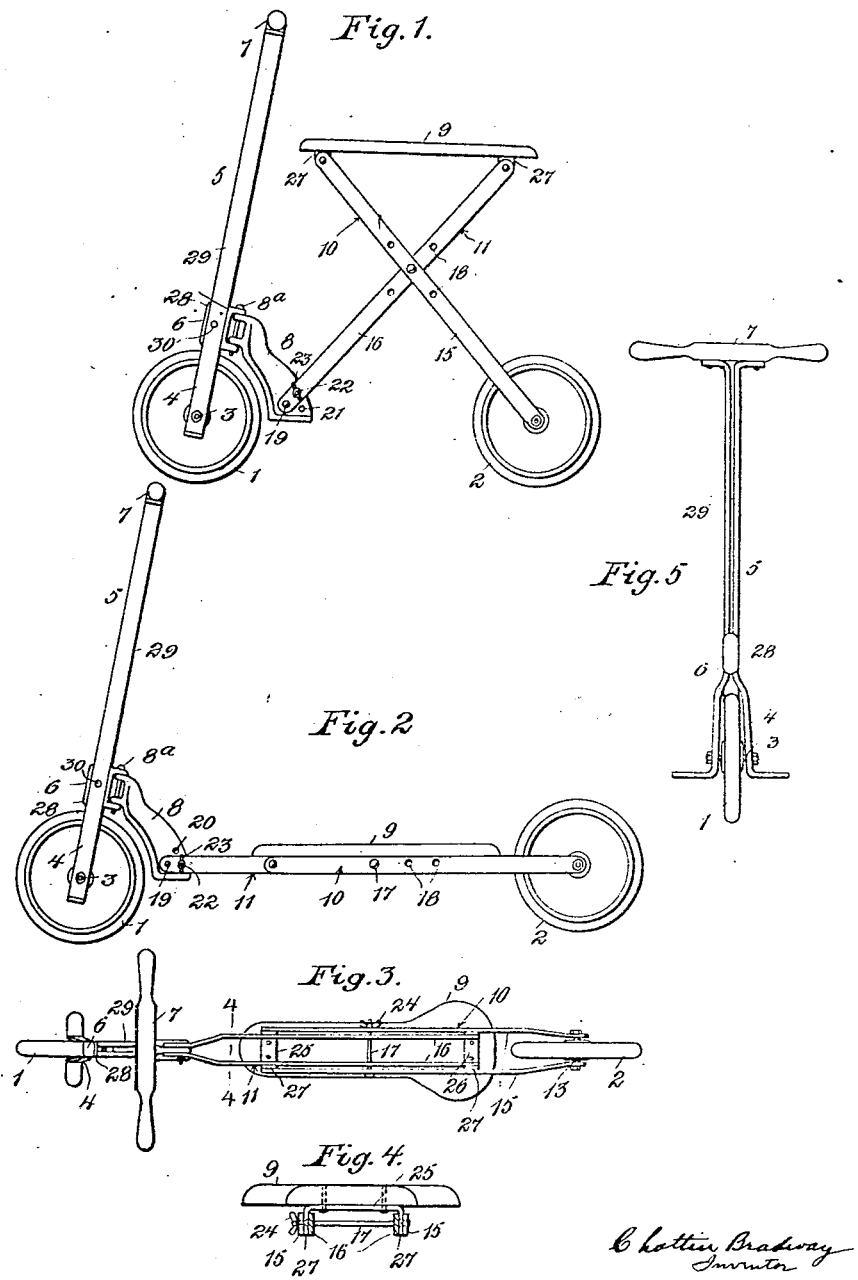

CHATTIN BRADWAY, OF NEW YORK, N. Y.

ADJUSTABLE COASTER.

1,285,009.  Specification of Letters Patent.  Patented Nov. 19, 1918.

Application filed February 9, 1917. Serial No. 147,610.

*To all whom it may concern:*

Be it known that I, CHATTIN BRADWAY, a citizen of the United States, and resident of New York, borough of Manhattan, in the county of New York and State of New York, have invented certain new and useful Improvements in Adjustable Coasters, of which the following is a specification.

This invention relates to coasters of that type comprising a low foot-board supported on front and rear wheels and connected at its front to a steering post or column by a hinge joint, the child propelling the car by impulses from one foot on the sidewalk or ground while the other foot rests on the foot-board.

The object of the present invention is to improve the construction in such a manner that the foot-board can be raised to different heights to form a seat, so that the coaster can be converted into a bicycle or velocipede without pedals, the propelling being accomplished by both feet producing impulses from the ground, as with the hobby-horse in use a century ago. The child can readily adjust the seat to a high or low position to make use of the coaster in two different ways.

For a more complete understanding of the invention reference is to be had to the following description and claims taken in connection with the accompanying drawing, in which similar reference characters designate similar parts, and in which, Figure 1 is a side view of the coaster with the seat raised;

Fig. 2 is a side view with the seat lowered;

Fig. 3 is a bottom plan view;

Fig. 4 is an enlarged section on the line 4—4, Fig. 3; and

Fig. 5 is a front view of the steering column and front wheel.

Referring to the drawing, 1 and 2 designate the front and rear wheels, there being only one rear wheel shown, although two may be employed. The front wheel 1 is mounted on an axle 3 carried by the fork 4 of the steering column or post 5. This post is made of two strips of metal fastened to a casting 6 positioned between them just above the wheel 1, and the upper ends of the strips are fastened to a handle bar 7. The lower ends of the strips are bent outwardly to form foot-rests when the seat is high, as in Fig. 1, and the rider is coasting. The casting 6 is part of a hinge to which a bracket 8 is connected by a pintle 8ª parallel with the steering post.

The combined seat and foot-board 9 is supported upon two crossing or overlapping members 10 and 11 hingedly connected respectively to the front and rear ends of the board 9. The members 10 and 11 are respectively connected to the bracket 8 and the axle 13 of the rear wheel. Each member is made, preferably of a pair of parallel links, and the links 15 of one member lie between the links 16 of the other member, and a bolt 17 passes through all the links to hold the frame of the coaster rigid, either when the seat and foot-board is up or down. The links have several holes 18 so as to permit the bolt to be adjusted to different points of crossing for holding the board 9 at any desired height.

The member 10 must be adjustably connected with the bracket 8, if the steering column is to remain at its right position. The lower or front end of the member 10 is connected by a pivot 19 to the bracket and in the bracket are holes 20 and 21, and a bolt 22 with a wing nut 23 is inserted through the member 10 and through either hole 20 or 21, to obtain the adjustments shown in Figs. 1 and 2. The bolt 17, which has a wing nut 24, must be taken out when changing the frame from the adjustment shown in Fig. 1 to that shown in Fig. 2, or vice versa.

On the under side of the board 9 are fastened inverted U-shaped members 25 and 26 which reinforce the board and also form hinge ears or lugs 27 to which the links of the members 10 and 11 are pivoted. As shown in Fig. 3, the links of the member 10 lie outside of and in contact with the lugs 27 of the front member 25, and the links of the member 11 lie between and in contact with the lugs 27 of the member 26, and as a consequence it is impossible for lateral motion between the foot-board 9 and the frame members 10 and 11 to exist. The lugs 27 of each member 25 and 26 are widely separated, as are the links of the members 10 and 11, which conduces to stability of the frame and particularly the seat and foot-board 9. In other words, the board 9 has four points of support quite widely separated.

The casting 6 has flanges 28 which engage the edges of the members 29 of the steering column, so that only a single rivet 30 is required to hold the parts together at the top of the fork.

Where the term "wheels" is used above and hereafter, the intent is to include equivalent means, such as runners.

What I claim as new and desire to secure by Letter Patent is:

1. A coaster comprising front and rear wheels, a body structure including swinging members, means for holding the members fixedly in different positions of adjustment one with respect to another, and a seat and foot-board carried by the members and adjustable to a position close to the ground for the rider to stand on it and propel with one leg, or adjustable to such a height that the child can sit on it and propel with both legs.

2. A coaster comprising front and rear wheels, and a body structure including link members, means for clamping the link members together in different positions of adjustment, and a foot-board supported by the link members and adjustable from a low position between the front and rear wheels to a position above the wheels for serving as a seat.

3. A coaster comprising front and rear wheels, and a body structure including a foot and seat board and adjustable crossing link members for supporting the board at different heights.

4. A coaster comprising a front wheel, a steering column on which the wheel is mounted, a bracket hingedly connected with the column, a link member adjustably fastened to the bracket, a seat and foot-board to which the link member is hingedly connected, a second link member hingedly connected with the said board, means for fastening the link members in different positions of adjustment, and a rear wheel connected with the second link member.

5. A coaster comprising a front wheel, a steering column on which the wheel is mounted, a bracket hingedly connected with the column, a link member adjustably fastened to the bracket, a seat and foot-board to which the link member is hingedly connected, a second link member hingedly connected with the said board, means for fastening the link members in different positions of adjustment, and a rear wheel connected with the second link member, one link member being made of two spaced sections and the other link member being located between the sections.

6. A coaster comprising a front wheel, a steering column on which the wheel is mounted, a bracket hingedly connected with the column, a link member adjustably fastened to the bracket, a seat and foot-board to which the link member is hingedly connected, a second link member hingedly connected with the said board, means for fastening the link members in different positions of adjustment, and a rear wheel connected with the second link member, each link member being composed of two spaced sections and the sections of one member being disposed between the sections of the other member and the sections being connected with the seat and foot-board at widely separated points.

7. A coaster comprising a front wheel, a steering column on which the wheel is mounted, a bracket hingedly connected with the column, a link member adjustably fastened to the bracket, a seat and foot-board, a hinge between the link member and said board, a second link member, a hinge between the second member and the said board, means for fastening the link members in different positions of adjustment, and a rear wheel connected with the second link member, each link member being composed of two spaced sections and the sections of one member being disposed between the sections of the other member and the sections being connected with the seat and foot-board at widely separated points, the hinge for one link member engaging the intermediate portion of the other link member to prevent relative lateral motion between the link members and board.

Signed at New York in the county of New York and State of New York this 8th day of Feb., A. D. 1917.

CHATTIN BRADWAY.

Copies of this patent may be obtained for five cents each, by addressing the "Commissioner of Patents, Washington, D. C."